United States Patent [19]
Coil

[11] Patent Number: 4,469,344
[45] Date of Patent: Sep. 4, 1984

[54] TILTABLE THREE-WHEELED VEHICLE

[76] Inventor: Stanley F. Coil, 1610 Lindsey Ave., Miamisburg, Ohio 45342

[21] Appl. No.: 424,156

[22] Filed: Sep. 27, 1982

[51] Int. Cl.³ .............................................. B62K 5/08
[52] U.S. Cl. .................................... 280/269; 280/282
[58] Field of Search ............... 280/269, 268, 267, 282; 180/210; 280/112 A

[56] References Cited

U.S. PATENT DOCUMENTS

| | | | |
|---|---|---|---|
| 1,283,942 | 11/1918 | Spanovic | 280/269 |
| 3,958,814 | 5/1976 | Smith | 280/269 |
| 4,088,199 | 5/1978 | Trautwein | 280/269 X |
| 4,351,410 | 9/1982 | Townsend | 280/267 X |
| 4,360,224 | 11/1982 | Sato et al. | 280/269 X |

*Primary Examiner*—John A. Pekar
*Attorney, Agent, or Firm*—Ralph L. Marzocco

[57] ABSTRACT

A three-wheeled vehicle in which the frame of a two-wheeled vehicle is pivotally interconnected with an assembly comprising two laterally positioned, steerable front wheels. In addition to causing the front wheels to turn, the rotational movement of the steering shaft having an integrally constructed spiral track simultaneously causes the frame to tilt by utilizing one end of an arm pivotally connected to the front wheel axle and the other end pivotally connected to tracking means for following the rotatable spiral track.

32 Claims, 5 Drawing Figures

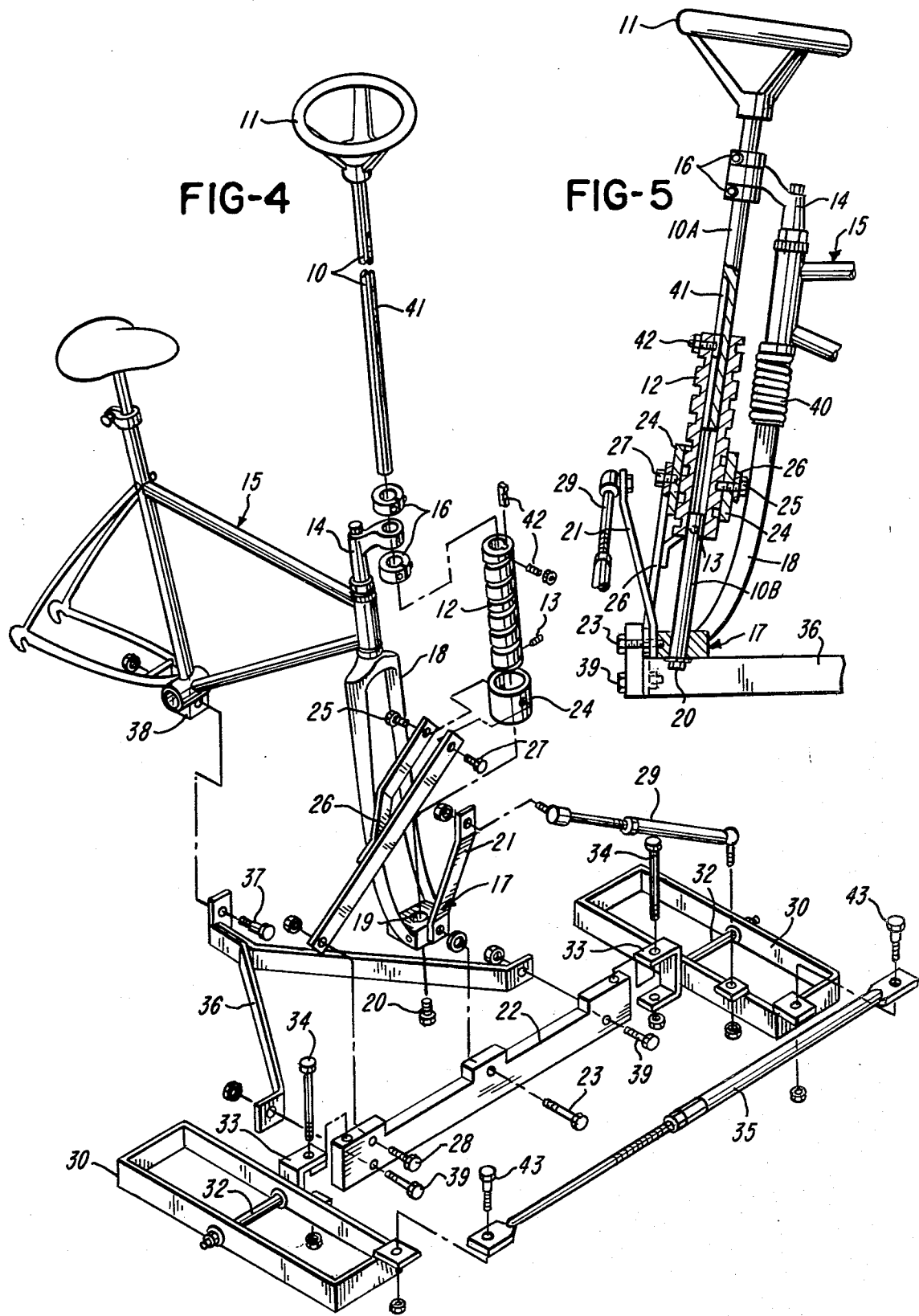

TILTABLE THREE-WHEELED VEHICLE

BACKGROUND OF THE INVENTION (1) Field of the Invention

This invention relates to three-wheeled vehicles and particularly to three-wheeled vehicles that tilt when making turns.

(2) Description of the Prior Art

As the cost of petroleum products continues to rapidly increase, the need for cheaper means of transportation becomes more imperative. The replacement of four-wheeled vehicles with two-wheeled or three-wheeled vehicles as a means of achieving increased economy of operation, although readily apparent, has not achieved deserved acceptance primarily because of the safety hazards associated with the operation of two-wheeled and three-wheeled vehicles. The stability of two-wheeled vehicles, because of their two point contact with the ground, is much less than that which can be achieved with three-wheeled vehicles. However, three-wheeled vehicles, in most instances, are merely modified two-wheeled vehicles whereby a side car is attached as an adjunct to the basic two-wheeled vehicle. This arrangement is not entirely satisfactory because of asymmetric load and handling characteristics. To improve the stability of three-wheeled vehicles prior art discloses that a two-wheeled forebody section which forms the front part of the vehicle is coupled at its rear to the front of a standard two-wheeled motorcycle from which the front fork and front wheels have been removed. In another disclosure two front wheels are not only coupled to a motorcycle frame by means of parallelogram-type wheel support assembly, but means are also provided whereby an operator may apply a stabilizing force to effect a desired banking, or upright, posture for the operator and the frame while maintaining all three wheels at the same angle with respect to the ground. The former arrangement has not been entirely satisfactory because the frame cannot be banked in unison with one or more of the wheels and the latter arrangement also has not been entirely satisfactory for it requires the intervention of the operator to apply such stabilizing force.

SUMMARY OF THE INVENTION

In accordance with the teachings of this invention, a three-wheeled vehicle would be made more stable by having the rear frame which supports the operator and the rear wheel tilt according to the direction and degree of turning of the two front wheels. As the front wheels are turned through an angle, causing both the rear frame and the rear wheel to be increasingly tilted or inclined, the center of gravity is shifted making the vehicle more stable in the turn. Moreover, because the timing and the amount of tilting is automatic, the operator is not required to make a conscious effort to utilize this function.

In order to produce such tiltable vehicle, either a three-wheeled would be originally constructed or a commercially available two-wheeled vehicle, such as a bicycle or a motorcycle or the like, would be modified to provide a three-wheeled vehicle whereby the front wheel is replaced by an assembly having two laterally positioned, steerable front wheels and a steering shaft having an integrally constructed spiral track such as a worm-gear and tracking means such as a worm-gear-nut responsive to the rotational movements of the worm-gear. The front fork of the frame of the two-wheeled vehicle and the steering shaft are pivotally connected to the assembly by means of an L-shaped cross member. The worm-gear-nut is pivotally connected by an arm to the front axle of the assembly while the steering shaft is connected to a front wheel subassembly by means of an adjustable arm to the L-shaped cross member. Whenever the steering wheel is turned, the worm-gear-nut ascends or descends the spiral incline plane of the worm-gear causing an angular change of the arm to the front axle in turn causing the rear frame and wheel to tilt in the direction the steering wheel is turned.

It is therefore an object of the invention to provide an assembly having two laterally positioned, steerable front wheels to which a frame of a two-wheeled vehicle may be easily and operatively attached.

It is a further object of the invention to provide a three-wheeled vehicle wherein the frame laterally tilts with the turning of the front wheels.

Still another object of the invention is to provide a three-wheeled vehicle of enhanced safety characteristics that is relatively simple to construct and inexpensive to maintain and operate.

Yet another object of the invention is to provide a three-wheeled vehicle which is capable of carrying a passenger in addition to a driver as well as cargo.

Other objects and advantages of the invention will become apparent to those skilled in the art from the following detailed description taken in connection with the accompanying drawings.

BRIEF DESCRIPTION OF THE DRAWINGS

FIG. 4 is a fragmentary perspective view similar to FIG. 1, except the components have been separated to facilitate comprehension of the invention.

FIG. 5 is an enlarged fragmentary side view of an alternate embodiment of the steering and tilting means of the invention.

DETAILED DESCRIPTION OF THE DRAWINGS

Figure 1:
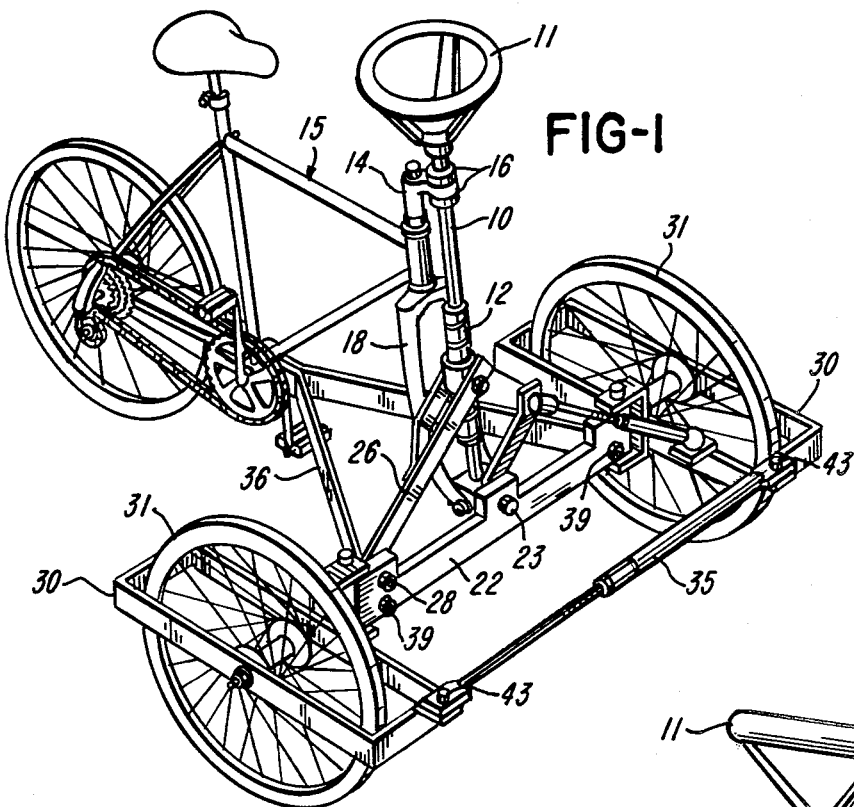
FIG. 1 is a perspective view of three-wheeled vehicle embodying the features of the present invention.
Figure 2:
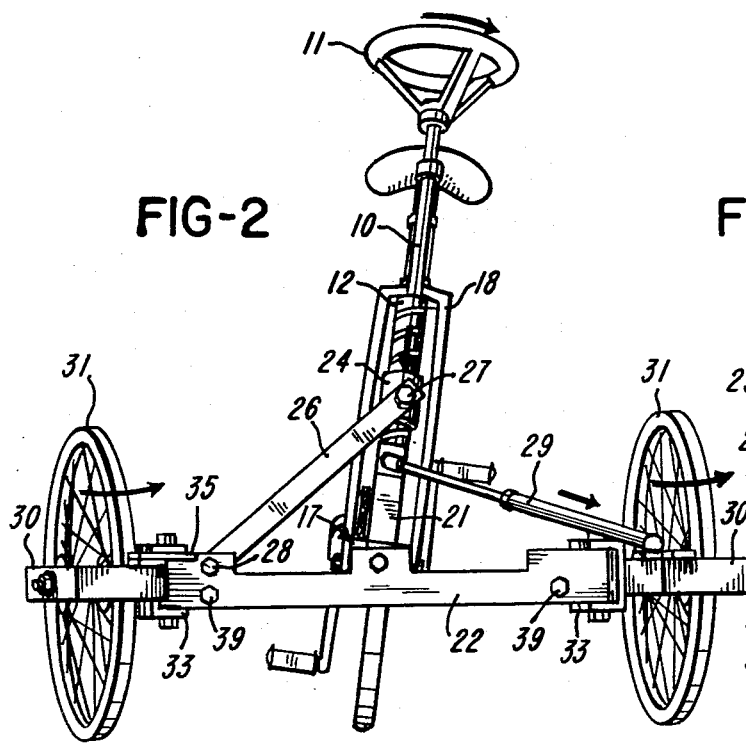
FIG. 2 is a front view of the vehicle shown in FIG. 1 with tie rod removed.

Referring to FIGS. 1-4, at the upper end of steering shaft 10 is attached steering wheel 11 while downwardly onto and concentrically with steering shaft 10 is attached worm-gear 12 by means of set screw 13. The head of stem 14, which is turned 90° from that of conventional stems, of the forward section of a two-wheeled vehicle frame 15 rotatably secures the upper section of steering shaft 10 to frame 15 while collar 16 vertically positions steering shaft 10 to frame 15. One leg of L-shaped lower cross member 17, which is parallel to the head of stem 14, rigidly interconnects the tines of front fork 18 of frame 15. Additionally, L-shaped lower cross member 17, which has a passageway 19 through which steering shaft 10 passes, rotatably secures the lower end of steering shaft 10 to frame 15 by means of connector 20. Forward of passageway 19 is the other leg, guide bar 21, of L-shaped lower cross member 17. L-shaped lower cross member 17 is pivotally connected to front axle 22 with connector 23 so that simultaneously whenever L-shaped lower cross member 17 is tilted from the normal so are guide bar 21, steering shaft 10, steering wheel 11, and front fork 18 as well as frame 15.

Worm-gear-nut 24, whose inner diameter is slightly larger than the outer diameter of worm-gear 12 which it encircles, engages worm-gear 12 by means of groove follower pin 25 and in addition groove follower pin 25 pivotally connects one tine of tilt fork 26 at its upper forked end to worm-gear-nut 24. Connector 27 pivotally connects the other tine of tilt fork 26 to worm-gear-nut 24. At its lower end tilt fork 26 is pivotally connected to one extremity of front axle 22 by means of connector 28. Pivotally connected to the upper end of guide bar 21 is adjustable guide rod 29 which in turn is pivotally connected to front wheel subassembly 30 located at the other extremity of front axle 22.

Front wheel subassembly 30 is a rectangular box-type construction consisting of two parallel front-to-back members connected by two parallel cross members. Pivotally connected to an inward front-to-back member is adjustable guide rod 29. Each front wheel 31 is supported by front wheel hub 32 of front wheel subassembly 30. Connected to inward front-to-back member of front wheel subassembly 30 is yoke 33 which in turn is pivotally connected to front axle 22 with connector 34. The connector 43 pivotally interconnects right and left front wheel subassembly 30 by means of tie rod 35. Rigidly connected to front axle 22 by connector 39 are the two arms of Y-shaped brace 36. In turn the leg of Y-shaped brace 36 is pivotally connected to bracket 38, which is rigidly connected to the two-wheeled frame 15, by means of connector 37.

From the foregoing, it can be seen that by turning steering wheel 11, steering shaft 10 is turned which causes the end of tilt fork 26 that is connected to worm-gear-nut 24 to be raised or lowered depending on the direction steering wheel 11 is turned. If steering wheel 11 is turned to the right, gear-worm-nut 24 ascends gear-worm 12 which in turn causes tilt fork 26 to be raised forcing frame 15 to be tilted to the right pivoting on connectors 23 and 37. Alternately, if steering wheel 11 is turned to the left, gear-worm-nut 24 descends gear-worm 12 which in turn causes tilt fork 26 to be lowered forcing frame 15 to be tilted to the left pivoting on connectors 23 and 37. The tilting of frame 15 simultaneously causes front wheel 31 to be turned by means of adjustable guide rod 29 which at one end is connected to front wheel subassembly 30 and at the other end to guide bar 31 of L-shaped lower cross member 17 which is rigidly connected to frame 15 but pivotally connected with connector 23 to front axle 22.

Although the three-wheeled vehicle depicted in FIG. 1 is pedal powered, it is readily apparent that in addition to having the rear wheel driven by circular pedaling means, one or both front wheels could be mechanically driven such as by a d.c. motor deriving its energy from a battery source. For example, a d.c. motor could be affixed to each of the front wheel subassembly 30 and drive a front wheel utilizing belt, gear or chain drive. The battery would be affixed to front axle 22.

Figure 3:
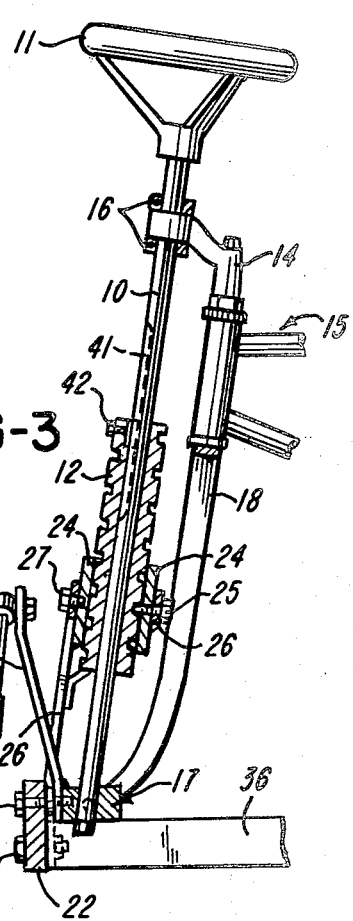
FIG. 3 is an enlarged fragmentary side view of the steering and tilting means of the vehicle shown in FIG. 1.

The foregoing embodiment would be used for a slower moving vehicle whereby road shock can be absorbed by the spring designed as a part of front fork 18 as shown in FIG. 3. However a faster moving vehicle, in order to lessen the amount of road shock transmitted to the driver, requires that front fork 18 incorporate shock absorbing means.

Another embodiment of the invention for use in a higher speed vehicle, such as a motorcycle, is shown in FIG. 5 having shock absorbing spring 40 integrally constructed as part of front fork 18. In order to accomodate the vibrational changes to front fork 18 caused by road shock, relief is provided to steering shaft 10 by separating it into upper shaft 10A and lower steering shaft 10B. Lower steering shaft 10B is rotatably secured to L-shaped lower cross member 17 by means of connector 20 and worm-gear 12 is rigidly secured to lower steering shaft 10B by means of set screw 13.

Worm-gear-nut 24, whose inner diameter is slightly larger than the outer diameter of worm-gear 12 which it encircles, engages worm-gear 12 by means of groove follower pin 25 and in addition groove follower pin 25 pivotally connects one tine of tilt fork 26 at its upper forked end to worm-gear-nut 24. Connector 27 pivotally connects the other tine of tilt fork 26 to worm-gear-nut 24. At its lower end tilt fork 26 is pivotally connected to one extremity of front axle 22 by means of connector 28. Pivotally connected to the upper end of guide bar 21 is adjustable guide rod 29 which in turn is pivotally connected to front wheel subassembly 30 located at the other extremity of front axle 22.

Upper steering shaft 10A is slotted to provide key way 41 and in turn the upper part of worm-gear 12 contains key 42 that fits key way 41. Any vibrational movement transmitted to a solid steering shift is relieved by having a two-piece steering shaft wherein upper steering shaft 10A is rotatably and slidably connected to lower steering shaft 10B. The remainder of the assembly is as a-fore-described.

Although the teachings of this invention have herein been discussed with reference to specific embodiments, it is understood that these are by way of illustration only and that others may wish to utilize this invention in different designs or applications.

I claim as my invention:

1. A three-wheeled vehicle combining a bicycle-type frame and rear driven wheel with an assembly for effecting front wheel turning and frame inclination comprising:
   first and second laterally spaced front wheels, each having a wheel mounting support pivotally connected to a front axle and pivotally connected to each other with an adjustable connector means;
   cross structure, having a Y-shaped member posteriorly and pivotally connected to said frame and anteriorly and rigidly connected to said front axle and for translating frame inclination into front wheel turning an L-shaped cross member rigidly connected to the front fork of said frame and pivotally connected to said front axle;
   steering means, having a steering shaft with an integrally constructed spiral track rotatably supported by said frame and said L-shaped cross member with said L-shaped cross member pivotally connected to an adjustable connector means pivotally connected to one of said wheel mounting supports, for turning said front wheels in unison about axes perpendicular to the spin axes of the front wheels; and
   tilting means, having spiral tracking means responsive to the rotational movements of said steering means with said tracking means pivotally connected to said front axle, for tilting said frame about an axes parallel to the ground whereby the amount of frame tilting is a function of the amount of front wheel turning.

2. The combination as set forth in claim 1 wherein said bicycle-type frame is pivotally connected to said cross structure about a single longitudinal axes.

3. The combination as set forth in claim 1 having means for driving said rear wheel.

4. The combination as set forth in claim 1 wherein said connecting means for pivotally connecting said L-shaped cross member to said wheel mounting support is a length adjustable arm for adjusting the alignment of said front wheels.

5. The combination as set forth in claim 1 wherein said wheel mounting supports are pivotally interconnected with a tie rod.

6. The combination as set forth in claim 1 wherein said spiral track is a worm-gear.

7. The combination as set forth in claim 1 wherein said spiral tracking means is a worm-gear-nut.

8. The combination as set forth in claim 1 whereby an operator of the vehicle upon turning the steering wheel of said steering means in one direction causes the worm-gear-nut to ascend the worm-gear or alternately, upon turning the steering wheel of said steering means in an opposite direction causes the worm-gear-nut to descend the worm-gear simultaneously effecting a turning of said front wheels and a tilting of said frame in the direction of the turn.

9. An assembly for converting a two-wheeled type bicycle with the front wheel removed to a three-wheeled vehicle particularly employing the original frame and rear driven wheel and for effecting front wheel turning and frame inclination, said assembly comprising:

first and second laterally spaced front wheels, each having a wheel mounting support pivotally connected to a front axle and pivotally connected to each other with an adjustable connector means;

cross structure, having a Y-shaped member adapted to be posteriorly and pivotally connected to said frame and anteriorly and rigidly connected to said front axle and for translating frame inclination into front wheel turning an L-shaped cross member adapted to be rigidly connected to the front fork of said frame and pivotally connected to said front axle;

steering means, having a steering shaft with an integrally constructed spiral track adapted to be rotatably supported by said frame and said L-shaped cross member with said L-shaped cross member pivotally connected to an adjustable connector means pivotally connected to one of said wheel mounting supports, for turning said front wheels in unison about axes perpendicular to the spin axes of the front wheels; and tilting means, having spiral tracking means responsive to the rotational movements of said steering means with said tracking means pivotally connected to said front axle, for tilting said frame about an axes parallel to the ground whereby the amount of frame tilting is a function of the amount of front wheel turning.

10. The combination as set forth in claim 9 wherein said bicycle-type frame is pivotally connected to said cross structure about a single longitudinal axes.

11. The combination as set forth in claim 9 having means for driving said rear wheel.

12. The combination as set forth in claim 9 wherein said connecting means for pivotally connecting said L-shaped cross member to said wheel mounting support is a length adjustable arm for adjusting the alignment of said front wheels.

13. The combination as set forth in claim 9 wherein said wheel mounting supports are pivotally interconnected with a tie rod.

14. The combination as set forth in claim 9 wherein said spiral track is a worm-gear.

15. The combination as set forth in claim 9 wherein said spiral tracking means is a worm-gear-nut.

16. The combination as set forth in claim 9 whereby an operator of the vehicle upon turning the steering wheel of said steering means in one direction causes the worm-gear-nut to ascend the worm-gear or alternately, upon turning the steering wheel of said steering means in an opposite direction causes the worm-gear-nut to descend the worm-gear simultaneously effecting a turning of said front wheels and a tilting of said frame in the direction of the turn.

17. A three-wheeled vehicle combining a motorcycle-type frame and rear driven wheel with an assembly for effecting front wheel turning and frame inclination comprising:

first and second laterally spaced front wheels, each having a wheel mounting support pivotally connected to a front axle and pivotally connected to each other with an adjustable connector means;

cross structure, having a Y-shaped member posteriorly and pivotally connected to said frame and anteriorly and rigidly connected to said front axle and for translating frame inclination into front wheel turning an L-shaped cross member rigidly connected to the front fork of said frame and pivotally connected to said front axle;

steering means, having a separated steering shaft with a lower portion rigidly connected with an integrally constructed spiral track and with an upper portion slidably connected with said spiral track and said spiral track rotatably supported by said frame and said L-shaped cross member with said L-shaped cross member pivotally connected to an adjustable connector means pivotally connected to one of said wheel mounting supports, for turning said front wheels in unison about axes perpendicular to the spin axes of the front wheels; and tilting means, having spiral tracking means responsive to the rotational movements of said steering means with said tracking means pivotally connected to said front axle, for tilting said frame about an axes parallel to the ground whereby the amount of frame tilting is a function of the amount of front wheel turning.

18. The combination as set forth in claim 17 wherein said motorcycle-type frame is pivotally connected to said cross structure about a single longitudinal axes.

19. The combination as set forth in claim 17 having means for driving said rear wheel.

20. The combination as set forth in claim 17 wherein said connecting means for pivotally connecting said L-shaped cross member to said wheel mounting support is a length adjustable arm for adjusting the alignment of said front wheels.

21. The combination as set forth in claim 17 wherein said wheel mounting supports are pivotally interconnected with a tie rod.

22. The combination as set forth in claim 17 wherein said spiral track is a worm-gear.

23. The combination as set forth in claim 17 wherein said spiral tracking means is a worm-gear-nut.

24. The combination as set forth in claim 17 whereby an operator of the vehicle upon turning the steering wheel of said steering means in one direction causes the worm-gear-nut to ascend the worm-gear or alternately, upon turning the steering wheel of said steering means in an opposite direction causes the worm-gear-nut to descend the worm-gear simultaneously effecting a turning of said front wheels and a tilting of said frame in the direction of the turn.

25. An assembly for converting a two-wheeled type motorcycle with the front wheel removed to a three-wheeled vehicle particularly employing the original frame and rear driven wheel and for effecting front wheel turning and frame inclination, said assembly comprising:

first and second laterally spaced front wheels, each having a wheel mounting support pivotally connected to a front axle and pivotally connected to each other with an adjustable connector means;

cross structure, having a Y-shaped member adapted to be posteriorly and pivotally connected to said frame and anteriorly and rigidly connected to said front axle and for translating frame inclination into front wheel turning an L-shaped cross member adapted to be rigidly connected to the front fork of said frame and pivotally connected to said front axle;

steering means, having a steering shaft with a lower portion rigidly connected with an integrally constructed spiral track and with an upper portion slidably connected with said spiral track and said spiral track adapted to be rotatably supported by said frame and said L-shaped cross member with said L-shaped cross member pivotally connected to an adjustable connector means pivotally connected to one of said wheel mounting supports, for turning said front wheels in unison about axes perpendicular to the spin axes of the front wheels; and tilting means, having spiral tracking means responsive to the rotational movements of said steering means with said tracking means pivotally connected to said front axle, for tilting said frame about an axes parallel to the ground whereby the amount of frame tilting is a function of the amount of front wheel turning.

26. The combination as set forth in claim 25 wherein said motorcycle-type frame is pivotally connected to said cross structure about a single longitudinal axes.

27. The combination as set forth in claim 25 having means for driving said rear wheel.

28. The combination as set forth in claim 25 wherein said connecting means for pivotally connecting said L-shaped cross member to said wheel mounting support is a length adjustable arm for adjusting the alignment of said front wheels.

29. The combination as set forth in claim 25 wherein said wheel mounting supports are pivotally interconnected with a tie rod.

30. The combination as set forth in claim 25 wherein said spiral track is a worm-gear.

31. The combination as set forth in claim 25 wherein said tracking means is a worm-gear-nut.

32. The combination as set forth in claim 25 whereby an operator of the vehicle upon turning the steering wheel of said steering means in one direction causes the worm-gear-nut to ascend the worm-gear or alternately, upon turning the steering wheel of said steering means in an opposite direction causes the worm-gear-nut to descend the worm-gear simultaneously effecting a turning of said front wheels and a tilting of said frame in the direction of the turn.

* * * * *